(12) United States Patent
Wang et al.

(10) Patent No.: US 11,830,230 B2
(45) Date of Patent: Nov. 28, 2023

(54) LIVING BODY DETECTION METHOD BASED ON FACIAL RECOGNITION, AND ELECTRONIC DEVICE AND STORAGE MEDIUM

(71) Applicant: Hangzhou Hikvision Digital Technology Co., Ltd., Hangzhou (CN)

(72) Inventors: Shengguo Wang, Hangzhou (CN); Xianlin Zhao, Hangzhou (CN); Chuan Shen, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 195 days.

(21) Appl. No.: 17/425,242

(22) PCT Filed: Jan. 7, 2020

(86) PCT No.: PCT/CN2020/070712
§ 371 (c)(1),
(2) Date: Jul. 22, 2021

(87) PCT Pub. No.: WO2020/151489
PCT Pub. Date: Jul. 30, 2020

(65) Prior Publication Data
US 2022/0092882 A1    Mar. 24, 2022

(30) Foreign Application Priority Data

Jan. 25, 2019  (CN) .......................... 201910072693.8

(51) Int. Cl.
*G06V 10/143* (2022.01)
*G06V 40/16* (2022.01)
(Continued)

(52) U.S. Cl.
CPC ............. *G06V 10/143* (2022.01); *G06N 3/04* (2013.01); *G06V 10/54* (2022.01); *G06V 10/80* (2022.01);
(Continued)

(58) Field of Classification Search
CPC .... G06V 10/143; G06V 40/171; G06V 10/54; G06V 10/82; G06V 40/166; G06V 10/80; G06V 40/45; G06N 3/04
See application file for complete search history.

(56) References Cited

U.S. PATENT DOCUMENTS 11,030,470 B2 * 6/2021 Han ........................ H04N 5/33
2002/0136435 A1 * 9/2002 Prokoski ................ G06V 40/45
382/118
(Continued)

FOREIGN PATENT DOCUMENTS

CN      107545241      1/2018
CN      107918773      4/2018
(Continued)

OTHER PUBLICATIONS

Yi, Dong, et al. "Face anti-spoofing: Multi-spectral approach." Handbook of Biometric Anti-Spoofing: Trusted Biometrics under Spoofing Attacks (2014): 83-102. (Year: 2014).*
(Continued)

*Primary Examiner* — Utpal D Shah
(74) *Attorney, Agent, or Firm* — NORTON ROSE FULBRIGHT US LLP

(57) ABSTRACT

Method, an electronic device and a storage medium for living body detection based on face recognition are disclosed. The method comprises: obtaining to-be-detected infrared image and visible light image; performing edge detection and texture feature extraction on the infrared image, and feature extraction on the visible light image
(Continued)

through a convolutional neural network; and determining whether the infrared and visible light images pass living body detection based on results of the edge detection and texture feature extraction on the to-be-detected infrared image, and a result of feature extraction on the to-be-detected visible light image through the convolutional neural network. The method, an electronic device and a storage medium for living body detection based on face recognition combine the advantages of three technologies of edge detection, texture feature extraction and convolution neural network, effectively perform living body detection, and improve the determination accuracy.

14 Claims, 5 Drawing Sheets

(51) Int. Cl.
  *G06V 10/54* (2022.01)
  *G06V 10/82* (2022.01)
  *G06V 10/80* (2022.01)
  *G06V 40/40* (2022.01)
  *G06N 3/04* (2023.01)

(52) U.S. Cl.
  CPC ............ *G06V 10/82* (2022.01); *G06V 40/166* (2022.01); *G06V 40/171* (2022.01); *G06V 40/45* (2022.01)

(56) References Cited

U.S. PATENT DOCUMENTS

| | | | | |
|---|---|---|---|---|
| 2010/0172567 | A1* | 7/2010 | Prokoski | A61B 5/0064 348/47 |
| 2014/0337948 | A1 | 11/2014 | Hoyos | |
| 2017/0372444 | A1* | 12/2017 | Hosokawa | H04N 7/18 |
| 2019/0228248 | A1* | 7/2019 | Han | G06V 10/82 |
| 2019/0354746 | A1* | 11/2019 | Zhang | G06V 40/45 |
| 2020/0380244 | A1* | 12/2020 | Zhou | G06V 10/145 |
| 2023/0031545 | A1* | 2/2023 | Oleynik | B62D 57/032 |

FOREIGN PATENT DOCUMENTS

| | | |
|---|---|---|
| CN | 107992794 | 5/2018 |
| CN | 108197586 | 6/2018 |
| CN | 108229331 | 6/2018 |
| CN | 108280418 | 7/2018 |
| CN | 108339401 | 7/2018 |
| CN | 108470169 | 8/2018 |
| CN | 108764091 | 11/2018 |
| CN | 108921041 | 11/2018 |
| CN | 108921100 | 11/2018 |
| CN | 108985134 | 12/2018 |
| CN | 109034102 | 12/2018 |
| EP | 3287943 | 2/2018 |

OTHER PUBLICATIONS

Extended European Search Report issued in Corresponding European Application No. 20744256.7, dated Jul. 27, 2022.
Liu et al., "Detecting Presentation Attacks from 3D Face Masks Under Multispectral Imaging." 2018 IEEE/CVF Conference on Computer Vision and Pattern Recognition Workshops (CVPRW), Jun. 18, 2018, DOI: 10.1109/CVPRW.2018.00014, pp. 47-52.
Sun et al., "Multispectral face spoofing detection using VIS-NIR imaging correlation" *International Journal of Wavelets, Multiresolution and Information Processing 2018*, 16(2), World Scientific Publishing Company, Mar. 25, 2018, pp. 1840003-1-1840003-15.
Wu et al., "Improved Local Ternary Patterns for Automatic Target Recognition in Infrared Imagery" Sensors 2015, 15(3), 6399-6418.
Yang et al., *Learn Convolutional Neural Network for Face Anti-Spoofing*. arxiv.org, Aug. 24, 2014, https://arxiv.org/pdf/1408.5601.pdf. Accessed Jul. 27, 2022.
Zhang et al., *CASIA-SURF: A Dataset and Benchmark for Large-scale Multi-modal Face Anti-Spoofing*. Cornell University Library, Dec. 2018, arxiv.org, arXiv:1812:00408v2 [cs.CV]. Accessed Dec. 23, 2018.
International Search Report and Written Opinion issued in Corresponding PCT Application No. PCT/CN2020/070712, dated Apr. 8, 2020 (English Translation provided).
Office Action issued in corresponding Chinese Application No. 201910072693.8, dated Mar. 18, 2023.

* cited by examiner

LIVING BODY DETECTION METHOD BASED ON FACIAL RECOGNITION, AND ELECTRONIC DEVICE AND STORAGE MEDIUM

CROSS REFERENCE TO RELATED APPLICATIONS

The present application is a national phase application under 35 U.S.C. § 371 of International Application No. PCT/CN2020/070712, filed Jan. 7, 2020, which claims the benefit of priority to Chinese patent application No. 201910072693.8, filed with the China National Intellectual Property Administration on Jan. 25, 2019 and entitled "Method, electronic device and storage medium for living body detection based on face recognition", each of which are incorporated herein by reference in their entirety.

TECHNICAL FIELD

The present application relates to the field of face recognition technologies, and in particular, to a method, an electronic device, and a storage medium for living body detection based on face recognition.

BACKGROUND

With the rapid development of the Artificial Intelligence (AI) industry, biometric identification has been applied in the security industry. For example, the above-mentioned biometric recognition includes face recognition, fingerprint recognition and iris recognition, etc.

Taking face recognition as an example, the face recognition technology is more and more mature, the recognition accuracy rate of face recognition in a specific scene is up to more than 95%, and even the faces of twins can be directly distinguished sometimes. However, as the increasing accuracy of face recognition, faces in photos and videos in real scenes may be mistaken as real faces, which bring an opportunity for criminals and huge losses or unnecessary troubles to legitimate users.

Currently, the main attack methods faced by face recognition include: (1) a photo attack method that prints a high-definition and realistic photo, dig out an important region of the face, and replace a real face with the dug important region of the face, wherein the photo includes a black-and-white photo and a color-printed photo, and the important region of the face can be the region where a nose, eyes, a mouth, etc. are positioned; (2) a video attack method that obtains a pre-recorded real face video and replaces the real face with the face in the video, wherein the video can be a real face video obtained from a social network site or a real face video recorded by a camera in a public place; (3) a model attack method that creates a realistic face model by a high-precision three Dimensional (3D) printer and replace the real face with the above-mentioned face model. Therefore, there is a need to provide a new technical solution capable of further performing the living body detection based on the results of face recognition.

The information disclosed in this background section is only for enhancement of understanding of the overall background of the present invention and should not be taken as an acknowledgement or any form of suggestion that this information is already known in the prior art to those skilled in the art.

SUMMARY

An object of the embodiments of the present application is to provide a method, an electronic device, and a storage medium for living body detection based on face recognition to enable living body detection.

To solve the above technical problem, the embodiments of the present application are implemented through the following aspects.

In a first aspect, the embodiments of the present application provide a method for living body detection based on face recognition, including: obtaining a to-be-detected infrared image and a to-be-detected visible light image respectively; performing edge detection and texture feature extraction on the to-be-detected infrared image; performing feature extraction on the to-be-detected visible light image through a convolutional neural network; and determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network.

In a second aspect, the embodiments of the present application provide an apparatus for living body detection based on face recognition, including: an obtaining module configured for a to-be-detected infrared image and a to-be-detected visible light image respectively; a processing module configured for performing edge detection and texture feature extraction on the to-be-detected infrared image, and performing feature extraction on the to-be-detected visible light image through a convolutional neural network; and a determining module configured for determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network.

In a third aspect, the embodiments of the present application provide an electronic device, including: a processor and a memory having computer executable instructions stored thereon that, when executed by the processor, cause the processor to implement the steps of the method according to the first aspect as described above.

In a fourth aspect, the embodiments of the present application provide a computer-readable storage medium for storing computer-executable instructions that, when executed by a processor, cause the processor to implement the steps of the method according to the first aspect described above.

In a fifth aspect, the embodiments of the present application provide a system for living body detection based on face recognition, including: an image acquisition device for acquiring infrared images and visible light images; an electronic device, comprising: a processor; and a memory configured to store computer executable instructions that, when executed, cause the processor to perform the following operations: obtaining infrared images and visible light images acquired by the image acquisition component, and selecting a to-be-detected infrared image and a to-be-detected visible light image; performing edge detection and texture feature extraction on the to-be-detected infrared image; performing feature extraction on the to-be-detected visible light image through a convolutional neural network; and determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network.

When the solution provided in this embodiment is applied to living body detection, the to-be-detected infrared image and the to-be-detected visible light image can be respectively obtained, edge detection and texture feature extraction are performed on the to-be-detected infrared image, and feature extraction is performed on the to-be-detected visible light image through a convolutional neural network, and whether the to-be-detected infrared image and the to-be-detected visible light image pass living body detection is determined based on the result of edge detection on the to-be-detected infrared image, the result of the above texture feature extraction and the result of feature extraction on the to-be-detected visible light image through the convolutional neural network. The process can combine the advantages of three technologies of edge detection, texture feature extraction and convolution neural network, and can effectively perform living body detection. In the case that the to-be-detected infrared image and the to-be-detected visible light image include the image region of a face, it can be efficiently determined whether the face in the image belongs to the face of a living body, so as to improve the determination accuracy.

BRIEF DESCRIPTION OF THE DRAWINGS

In order to illustrate the embodiments of the present application and the technical solutions of the prior art more clearly, the following briefly describes the embodiments and the drawings needed in the prior art. Obviously, the drawings in the following description are only some embodiments of the present application, and it is obvious for those skilled in the art that other drawings can be obtained according to the drawings without creative efforts.

DETAILED DESCRIPTION

In order to make the objects, technical solutions and advantages of the present application more clear, the following further describes the present application in detail with reference to the accompanying drawings and embodiments. Obviously, the described embodiments are only a part of the embodiments of the present application, rather than all the embodiments. Based on the embodiments in the present application, all other embodiments obtained by those skilled in the art without creative work shall fall within the protection scope of the present application.

Figure 1:
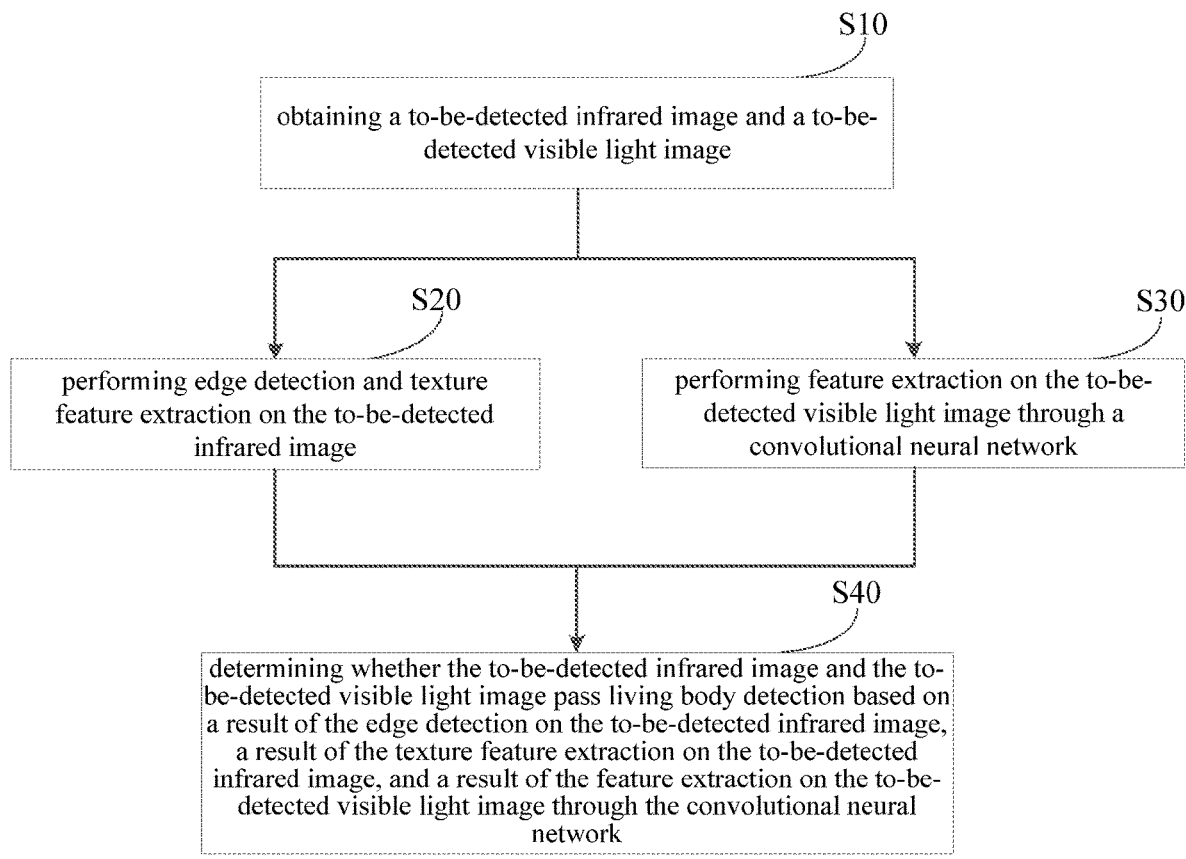
FIG. 1 is a schematic flowchart illustrating a method for living body detection based on face recognition according to an embodiment of the present application.

FIG. 1 illustrates a schematic flowchart of a method for living body detection based on face recognition according to an embodiment of the present application. The method may be performed by an electronic device, for example, the above electronic device may be a terminal device or a server device. In other words, the above method may be performed by software or hardware installed on a terminal device or a server device. The above server device includes but is not limited to: a single server, a server cluster, a cloud server or a cloud server cluster, etc. As shown in FIG. 1, the method includes the following steps S10-S40.

S10: obtaining a to-be-detected infrared image and a to-be-detected visible light image respectively.

In an embodiment of the present application, the above to-be-detected infrared image and the to-be-detected visible light image may be: an infrared image a the visible light image respectively acquired by an image acquisition component for the same scene.

Specifically, the above to-be-detected infrared image and the to-be-detected visible light image may include image regions of the same face. In addition, the above to-be-detected infrared image may include image regions of a plurality of faces, and the above to-be-detected visible light image also includes the above image regions of the plurality of faces.

The above scene may be a scene where an access control device is positioned. The above image acquisition component may be a component that can acquire not only infrared images but also visible light images, such as a binocular camera, etc.

In another embodiment of the present application, the above to-be-detected infrared image and the to-be-detected visible light image may be images acquired by the image acquisition component at the same moment, and thus have the same time stamp.

In addition, the above image acquisition component can also acquire a plurality of infrared images and a plurality of visible light images, and then select the infrared image and the visible light image that contains an image region of the same face from the above plurality of infrared images and the plurality of visible light images as the to-be-detected infrared image and the to-be-detected visible light image respectively.

S20: performing edge detection and texture feature extraction on the to-be-detected infrared image.

In image processing and computer vision, edge detection can be performed on an image to detect edge information in the image. For example, edge detection is performed on an image to detect pixel points with obvious brightness change in the image.

The texture feature is a visual feature that reflects homogeneity in an image. One of the attacks faced by face recognition is a tablet electronic product attack, in which, the tablet electronic product pretends to be a real face by way of displaying a non-real face in a photo or playing a non-real face in a video. Due to the fact that the tablet electronic product is interfered by high frequency, a large number of moire can be generated when a photo or a video is displayed, and the features of an image presented by the tablet electronic product are changed. In this case, when the face recognition is performed, it is possible to determine whether there is moire in the image by analyzing the image features, and then whether a real face or an unreal face appears in the image can be quickly distinguished.

In one embodiment of the present application, the corresponding texture feature may be extracted through an internal relationship between imaging pixels in an to-be-detected infrared image.

S30: performing feature extraction on the to-be-detected visible light image through a convolutional neural network.

The convolutional neural network is a network model which is often used in deep learning. The network model has a multilayer structure, each layer performs feature extraction on input data of the layer, and extracted features are continuously input into the next layer in the form of a two-dimensional image.

S40: determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network.

For ease of description, the result of edge detection on the to-be-detected infrared image may be referred to as a first result, the result of texture feature extraction may be referred to as a second result, and the result of feature extraction on the to-be-detected visible light image through the convolutional neural network may be referred to as a third result.

In an embodiment of the present application, since the first result, the second result, and the third result are all features of an image, feature fusion may be performed on the first result, the second result, and the third result, and then it is determined whether the to-be-detected infrared image and the to-be-detected visible light image pass the living body detection based on a result of the feature fusion.

For example, a weighted calculation may be performed on the first result, the second result, and the third result, and the result of the weighted calculation may be used as the result of the feature fusion.

In another embodiment of the present application, it may also be determined whether the to-be-detected infrared image and the to-be-detected visible light image pass living body detection based on the first result, the second result, and the third result, respectively, and then the number of determination results is counted, and a result with the highest number of statistics is taken as a final determination result.

For example, it is determined that the to-be-detected infrared image and the to-be-detected visible light image pass the living body detection based on the first result; it is determined that the to-be-detected infrared image and the to-be-detected visible light image do not pass living body detection based on the second result; and it is determined that the to-be-detected infrared image and the to-be-detected visible light image pass the living body detection based on the third result. According to statistics, the number of results indicating passing the living body detection is 2, and the number of results indicating not passing the living body detection is 1, the final determination result is: the to-be-detected infrared image and the to-be-detected visible light image do not pass the living body detection.

When the to-be-detected infrared image and the to-be-detected visible light image include image regions of the same face, the fact that the to-be-detected infrared image and the to-be-detected visible light image pass living body detection means: the to-be-detected infrared image and the to-be-detected visible light image are images acquired for a real face; the fact that the to-be-detected infrared image and the to-be-detected visible light image do not pass living body detection means: the to-be-detected infrared image and the to-be-detected visible light image are images acquired for a non-real face, for example, images captured from a photo, or a video.

Therefore, in the solution for the living body detection based on face recognition provided in this embodiment, to-be-detected infrared image and to-be-detected visible light image are obtained, edge detection and texture feature extraction are performed on the to-be-detected infrared image, and feature extraction is performed on the to-be-detected visible light image through a convolutional neural network, and whether the to-be-detected infrared image and the to-be-detected visible light image pass the living body detection is determined based on the result of the edge detection on the to-be-detected infrared image, the result of the above texture feature extraction and the result of the feature extraction on the to-be-detected visible light image through the convolutional neural network. The process can combine the advantages of three technologies of edge detection, texture feature extraction and convolution neural network, which can effectively perform living body detection. In the case that the to-be-detected infrared image and the to-be-detected visible light image include the image regions of a face, it can be efficiently determined whether the face in the image belongs to the face of living body, so as to improve the determination accuracy.

In an embodiment of the present application, before the to-be-detected infrared image and the to-be-detected visible light image are obtained in S10, the image acquisition component may be further used to acquire infrared images and visible light images, and then faces are positioned in the infrared images and the visible light images respectively through a face detection algorithm.

In this case, when the to-be-detected infrared image and the to-be-detected visible light image are obtained in S10, the to-be-detected infrared image and the to-be-detected visible light image can be respectively obtained from the infrared images and the visible light images according to the result of face positioning in the infrared images and visible light images.

Specifically, the image acquisition component may acquire infrared images according to a preset infrared image acquisition frequency, and acquire visible light images according to a preset visible light image acquisition frequency. The infrared image acquisition frequency and the visible light image acquisition frequency may be the same or different, which is not limited in the embodiments of the present application.

In an embodiment of the present application, when faces are respectively positioned in infrared images and visible light images through a face detection algorithm, face regions in the infrared images and the visible light images may be detected, that is, face positioning is performed in the infrared images and the visible light images, through the face detection algorithm. In addition, after the face regions are detected, positions of face feature points in infrared images and positions of face feature points in visible light images can be determined on the basis of the detected face regions.

In view of the above case, when faces are respectively positioned in the infrared images and the visible light images by the face detection algorithm, the obtained results of face positioning may include information of regions of faces in images and positions of face feature points.

When the region of the face in an image is a rectangular region, the above information of the region may be coordinates of two diagonal vertices of the rectangular region. The above positions of face feature points can include positions of feature points for describing the contour of the face in the image, positions of feature points for describing the eyes of a human in the image, positions of the feature points for describing the mouth of the human in the image.

Specifically, the infrared image and the visible light image that include image regions of the same face can be selected, according to the result of positioning a face, from the infrared images and the visible light images as the to-be-detected infrared image and the to-be-detected visible light image, respectively.

In an embodiment of the application, the infrared image and the visible light image, in which the information of the face in the region of image is matched and the positions of the face feature points are matched, can be determined as the to-be-detected infrared image and the to-be-detected visible light image.

For example, when the region overlap ratio is greater than a first preset threshold, it can be considered that the information of the regions is matched. In addition, in the case where the face feature points include feature points for representing the human eyes, the interpupillary distance of the human eyes may be calculated from positions of the face feature points, and then when the proportion of interpupillary distances is greater than a second preset threshold, it can be considered that the positions of the face feature points are matched.

In another embodiment of the application, deflection angles and interpupillary distances of faces in infrared images can be obtained according to positions of face feature points in the infrared images, and deflection angles and interpupillary distances of the faces in the visible light images can be obtained according to the positions of the face feature points in the visible light images; and the to-be-detected infrared image and the to-be-detected visible light image are selected from the infrared images and the visible light images according to obtained deflection angles and interpupillary distances.

Specifically, postures of faces can be represented by deflection angles and interpupillary distances thereof. When the posture of a face represented by the deflection angle and the interpupillary distance of the face in an infrared image is consistent with the posture of a face represented by the deflection angle and the interpupillary distance thereof in the visible light image, it can be considered that the infrared image and the visible light image include the image regions of the same face, and can be respectively used as the to-be-detected infrared image and the to-be-detected visible light image.

For example, postures of faces can be considered to be consistent when the angle difference between the deflection angles is smaller than a preset difference value and the ratio between the interpupillary distances is greater than a third preset threshold value.

The living body detection method provided in the embodiment of the present application will be described in detail with reference to the specific embodiment shown in FIG. 2.

Figure 2:
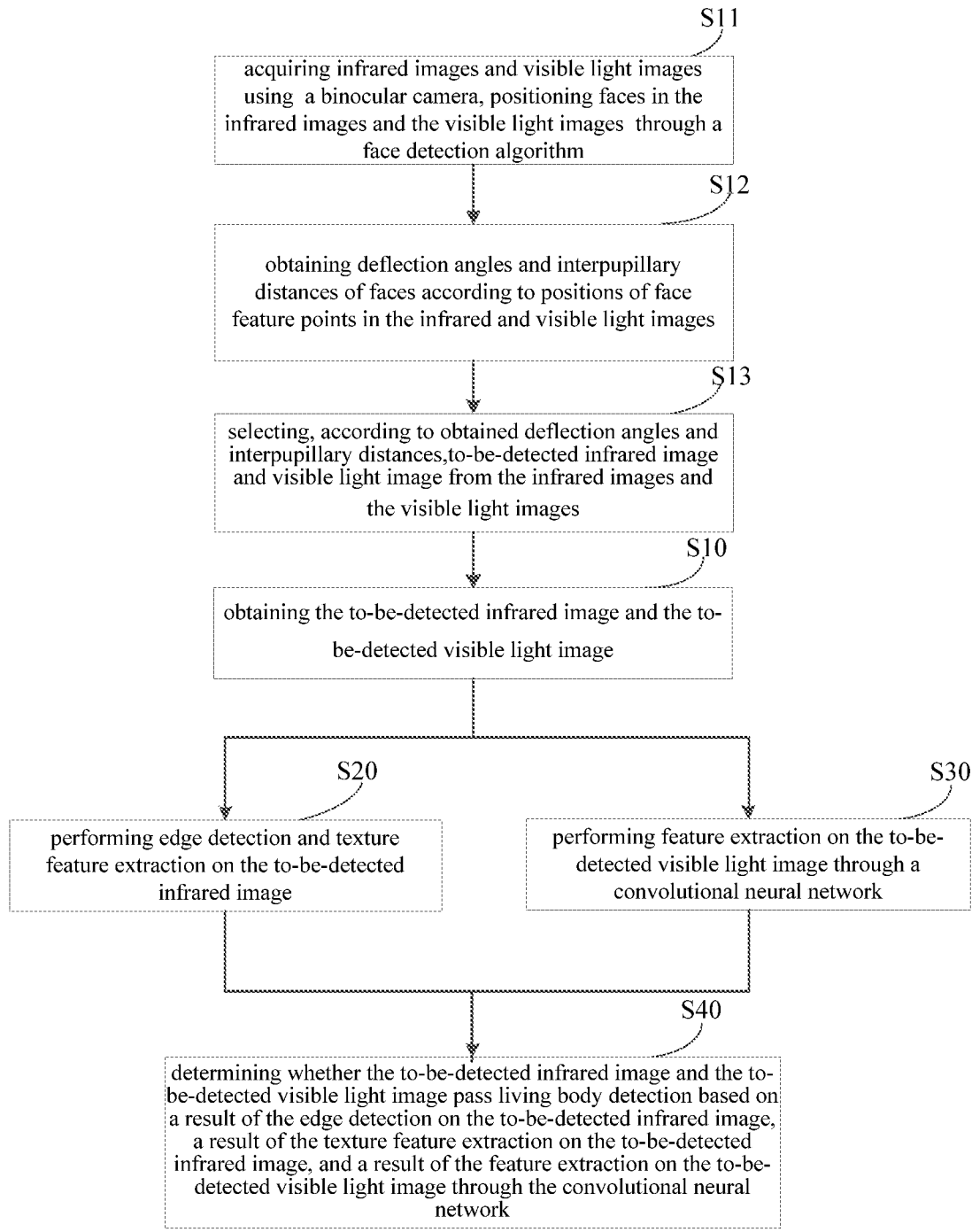
FIG. 2 is another schematic flowchart illustrating a method for living body detection based on face recognition according to an embodiment of the present application.

FIG. 2 shows another schematic flowchart of a method for living body detection based on face recognition according to the embodiments of the present application. The method may be performed by an electronic device, for example, a terminal device or a server device. In other words, the above method may be performed by software or hardware installed in a terminal device or a server device. The above server device includes but is not limited to: a single server, a server cluster, a cloud server or a cloud server cluster, etc. As shown in FIG. 2, the method includes the following steps S11-S40.

S11: acquiring infrared images and visible light images using an image acquisition component, and respectively positioning faces in the infrared images and the visible light images through a face detection algorithm.

In one possible implementation, the image acquisition component may include a binocular camera.

In one embodiment of the present application, the method includes: detecting face regions in infrared images and visible light images through a face detection algorithm. In addition, after the above face regions are detected, the number of infrared faces and the positions of face feature points in the infrared images can be determined, and the number of visible light faces and the positions of the face feature points in the visible light images can be determined, on the basis of the detected face region. The above process realizes the positioning of faces in the infrared images and the visible light images respectively.

The above infrared face refers to an image region in the infrared image where a face is positioned. The visible light face refers to an image region in the visible light image where a face is positioned.

Specifically, it can be roughly determined whether the infrared images and the visible light images contain image regions of the same face through the number of infrared faces in the infrared images and the number of visible light faces in the visible light images.

If the number of the infrared faces is different from that of the visible light faces, the probability that the infrared image and the visible light image contain the image region of the same face is low, on the contrary, if the number of the infrared faces is the same as that of the visible light faces, the probability that the infrared image and the visible light image contain the image region of the same face is high.

S12: obtaining deflection angles and interpupillary distances of faces according to positions of face feature points in infrared images and positions of face feature points in visible images.

Specifically, in this step, deflection angles and interpupillary distances of faces in infrared images are obtained according to positions of face feature points in the infrared images, and deflection angles and interpupillary distances of faces in visible light images are obtained according to positions of face feature points in visible light images.

In one embodiment of the present application, the distance between two eyes of a human can be calculated according to positions of feature points related to the human eyes, and then the interpupillary distance of the face can be determined according to the above distance.

S13: selecting, according to obtained deflection angles and interpupillary distances, a to-be-detected infrared image and a to-be-detected visible light image from infrared images and visible light images acquired by the image acquisition component.

The deflection angle and interpupillary distance of a face can reflect the posture of the face. In application scenes such as face recognition and face detection, images of a human face facing an image acquisition component may be acquired with high quality, and thus produce better results in face recognition and detection. Therefore, after the image acquisition component acquires infrared images and visible light images, the above infrared images and visible light images can be filtered according to deflection angles and interpupillary distances, and images of faces facing away from the image acquisition component are filtered. For example, infrared images and visible light images with deflection angles larger than a preset angle and interpupillary distances smaller than a preset distance are filtered out.

Therefore, face images with poor quality in the infrared images and the visible light images acquired by the image acquisition component can be filtered out according to the two parameters, i.e., deflection angles and interpupillary distances, so as to improve the robustness of the living body detection.

In an embodiment of the application, the image quality can be detected according to an average brightness value of pixel points in the image. Specifically, the average brightness value of pixel points can be calculated for each infrared image acquired by the image acquisition component, and the average brightness values of pixel points can be calculated for each visible light image acquired by the image acquisition component. When the average brightness value is smaller than a first preset brightness value, the image is dark and the image quality is poor, and when the average brightness value is larger than a second preset brightness value, the image is over-bright and possibly over-exposed and the image quality is poor. Therefore, images with poor quality in the infrared images and the visible light images can be filtered out in this way.

The first preset brightness value and the second preset brightness value may be set according to a specific application scene, which is not limited in the embodiments of the present application.

In addition, when filtering out images with poor quality in the infrared images and the visible light images, it can also be realized by combining one or more of the following information:

average pixel value, interpupillary distance, deflection angle, etc.

S10: respectively obtaining a to-be-detected infrared image and a to-be-detected visible light image.

In one case, the to-be-detected infrared image and the to-be-detected visible light image are selected in the S13, it is equivalent to the to-be-detected infrared image and the to-be-detected visible light image are obtained in this step. In this case, the completion of the above S13 is equivalent to the completion of this step.

In another case, the selection of the to-be-detected infrared image and the to-be-detected visible light image in S13 may be understood as that selection of images, and the to-be-detected infrared image and the to-be-detected visible light image are not obtained or read. In this case, in this step, the to-be-detected infrared image and the to-be-detected visible light image may be obtained based on the selection result of S13.

S20: performing edge detection and texture feature extraction on the to-be-detected infrared image.

In one possible implementation, edge detection on the to-be-detected infrared image includes: filtering out noise in the to-be-detected infrared image through Gaussian transformation; performing, through a Sobel operator, edge detection on the to-be-detected infrared image with noise filtered out to obtain an edge detection result; and determining histogram information of the edge detection result in different directions for the number of the edge pixel points, and filtering out noise in the edge detection result according to the histogram information. In this way, edge information of image regions of faces can be obtained when the image regions of faces exist in the to-be-detected infrared image, and in this case, the edge information can be used as features of the image region of the face, referred to as the face feature.

When the to-be-detected infrared image is subjected to Gaussian transformation, high-frequency information in the to-be-detected infrared image can be filtered out, and noise in the image is often exhibited as high-frequency information. Therefore, the noise in the to-be-detected infrared image can be filtered out after the to-be-detected infrared image is subjected to Gaussian transformation.

Of course, other transformation methods may also be used to filter noise in the to-be-detected infrared image, which is not limited in the embodiments of the present application.

When the edge detection is performed on the to-be-detected infrared image after the noise is filtered through the sobel operator, edge information of image content can be detected, and an edge image is obtained, which is referred to as the edge detection result here. For example, edge information of a face in an image is detected.

In addition, the above different directions may include a horizontal direction and a vertical direction.

Specifically, when the histogram information of the edge detection result for the number of edge pixel points in different directions is determined, since the edge detection result is an edge image, the number of edge pixel points included in each pixel row in the edge image can be determined as histogram statistical information, and/or the number of edge pixel points included in each pixel column in the edge image can be determined as histogram statistical information.

Since the number of edge pixel points presented by the edge information of the face in the image along the pixel rows or the pixel columns is large, when the number of the edge pixel points represented by the histogram information corresponding to pixel rows or pixel columns is small, the probability that the edge pixel points in the pixel rows or pixel columns are not the edge pixel points of the face is high, and therefore these pixel points can be filtered out from the above edge image.

In one possible implementation, the living body detection may be based on static image texture. In this case, one or more features with motion invariant properties, such as boundary lines or corner points in the image, need to be extracted from the image, and a living body detection model is created according to these features. And then it is detected whether the image is an image acquired for the living body through the living body detection model.

Specifically, in the case that the above living body is a real face, when a real face detection is performed based on static image texture, the real face detection may be implemented based on a Local Binary Pattern (LBP), a Gabor wavelet, a Histogram of Oriented Gradients (HOG), and the like.

In one possible implementation, living body detection may be based on dynamic textures. In this case, when the above living body is a real face, the real face recognition can be performed by learning the structure and dynamic information of the micro-texture of the real face and performed by feature operator expansion in a spatial domain using LBP.

In one possible implementation, extracting the texture features of the to-be-detected infrared image includes: extracting texture features of the to-be-detected infrared image through a Dynamic Local Ternary Pattern (DLTP).

Specifically, the above DLTP is evolved from a Local Ternary Pattern (LTP). LTP is evolved from Local Binary Pattern (LBP).

The procedure of obtaining DLTP information based on LTP is briefly described below.

Assuming that the pixel value of the current pixel point is $g_c$, the gray values of P adjacent pixel points which are centered at the current pixel point are $g_1, g_2, \ldots, g_P$ respectively.

First, $g_c \pm \tau$ is taken as a threshold, a binarization processing is performed on the above adjacent pixel points.

Then, the pixel values of adjacent pixel points after the binarization processing are weighted according to different positions of adjacent pixel points and a weighted sum is calculated, resulting in a local ternary mode value of the current pixel point $f_{LTP_{P,R}}(x_c, y_c, \tau)$, namely, $$f_{LTP_{P,R}}(x_c, y_c, \tau) = \sum_{i=1}^{P} 2^{i-1} s(g_i - g_c)$$

$$s(g_i - g_c) = \begin{cases} 1, & g_i \geq g_c + \tau \\ 0, & g_c - \tau < g_i - g_c < g_c + \tau \\ -1, & g_i \leq g_c - \tau \end{cases}$$

wherein, the $x_c$, $y_c$ are horizontal and vertical coordinates of the current pixel point in the image. $s(g_i-g_c)$ represents the pixel value of the i-th adjacent pixel point after the binarization processing.

When the local ternary mode is configured for extracting texture features of images, the above value of $\tau$ is difficult to set. In an embodiment of the present application, the above $\tau$ can be determined by Weber's law, the expression of Weber's law is:

$$\tau = \frac{\Delta I}{I} = \frac{|g_c - g_i|}{g_c}$$

Finally, the DLTP histogram obtained by the local ternary mode is:

$$h_j = \sum_{x,y} \delta\{f_{LTP_{P,R}}(x_c, y_c, \tau) - j\}, j = 0, 1, \ldots, 2^P$$

$$\delta(u) = \begin{cases} 1, & u = 0 \\ 0, & u \neq 0 \end{cases}$$

wherein, the x,y are horizontal and vertical coordinates of the pixel points in the image.

S30: performing feature extraction on the to-be-detected visible light image through a convolutional neural network.

The convolutional neural network is a network model which is often used in deep learning. The network model has a multilayer structure, each layer performs feature extraction on input data of the layer, and these extracted features are continuously input into the next layer in the form of a two-dimensional image.

In an embodiment of the present application, the size of each original image in the real face database may be used as the size of the input image of the above convolutional neural network when designing the structure of the above convolutional neural network, in this way, the above convolutional neural network may perform feature extraction on an input image of one size, thereby reducing an excessive calculation amount of the convolutional neural network caused by the multi-scale input image.

The original image in the real face database can be used as a training sample to train the above convolutional neural network when the above convolutional neural network is trained, so that the above convolutional neural network learns the features of the real face in each original image in the real face database.

S40: determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network.

In an embodiment of the application, feature fusion may be performed on the result of edge detection on the to-be-detected infrared image, the result of texture feature extraction, and the result of feature extraction on the to-be-detected visible light image through a convolutional neural network, and then it is detected whether the to-be-detected infrared image and the to-be-detected visible light image pass living body detection according to a result of the feature fusion.

Specifically, the feature fusion can be implemented through a full-connection layer of the network model.

The full-connection layer can include a plurality of nodes, and each node is configured for respectively obtaining the result of the edge detection on the to-be-detected infrared image, the result of the texture feature extraction on the infrared image, and the result of the feature extraction on the to-be-detected visible light image through the convolutional neural network. In this way, the full-connection layer can integrate the features corresponding to the above three results.

A full-connection layer typically has the most parameters due to its property of being fully connected. For example, in VGG16, the first full-connection layer FC1 has 4096 nodes and the upper pooling layer POOL2 has 7*7*512=25088 nodes, then the above FC1 requires 4096*25088 weight values, these weight values consume a large amount of memory.

In an embodiment of the present application, output results of the full-connection layer can be classified through classifiers such as softmax, and it can be determined whether the to-be-detected infrared image and the to-be-detected visible light image pass living body detection. For example, the softmax classifier may determine input information of the softmax classifier by setting a threshold, that is, determine an output result of the full-connection layer. When the input information of the softmax classifier is greater than a preset threshold, it is determined that the infrared image and the visible image to be detected are images for a real face and pass living body detection; otherwise, it is determined that the to-be-detected infrared image and the to-be-detected visible light image are images for an unreal face and do not pass the living body detection.

Therefore, when the solution provided in this embodiment is applied to living body detection, the to-be-detected infrared image and the to-be-detected visible light image can be respectively obtained, edge detection and texture feature extraction are performed on the to-be-detected infrared image, and feature extraction is performed on the to-be-detected visible light image through a convolutional neural network, and whether the to-be-detected infrared image and the to-be-detected visible light image pass living body detection is determined based on the result of edge detection on the to-be-detected infrared image, the result of the above texture feature extraction and the result of feature extraction on the to-be-detected visible light image through the convolutional neural network. The process can combine the advantages of three technologies of edge detection, texture feature extraction and convolution neural network, and can effectively perform living body detection. In the case that the to-be-detected infrared image and the to-be-detected visible light image include the image regions of a face, it can be efficiently determined whether the face in the image is the face of a living body, and so as to improve the determination accuracy.

Figure 3:
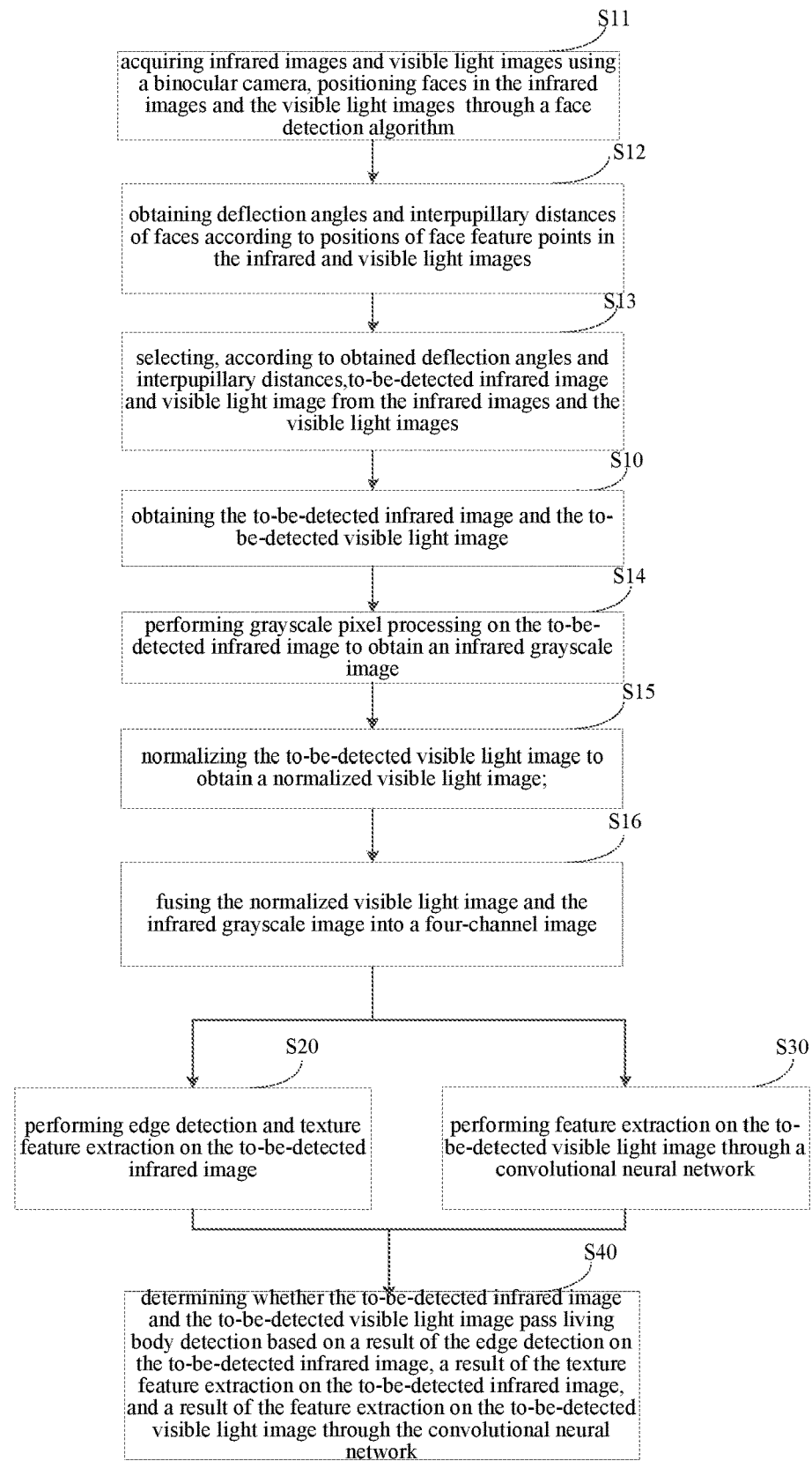
FIG. 3 is another schematic flowchart illustrating a method for living body detection based on face recognition according to an embodiment of the present application.

FIG. 3 shows another schematic flowchart of a method for living body detection based on face recognition according to the embodiments of the present application. The method may be performed by an electronic device, for example, a terminal device or a server device. In other words, the above method may be performed by software or hardware installed in a terminal device or a server device. The above server device includes but is not limited to: a single server, a server cluster, a cloud server or a cloud server cluster, etc. As shown in FIG. 3, the method may include the following steps S11-S40.

S11: acquiring infrared images and visible light images using an image acquisition component, and positioning faces in the infrared images and the visible light images through a face detection algorithm.

In one possible implementation, this step includes: detecting face regions in the infrared images and the visible light images through a face detection algorithm. In addition, after the above face regions are detected, the number of infrared faces and the positions of face feature points in the infrared images can be determined, and the number of visible light faces and the positions of the face feature points in the visible light image can be determined, on the basis of the detected face regions. The above process realizes the positioning of the face in the infrared image and the visible light image respectively.

S12: obtaining deflection angles and interpupillary distances of faces according to positions of the face feature points in the infrared images and positions of the face feature points in the visible images.

Specifically, in this step, deflection angles and interpupillary distances of faces in the infrared images are obtained according to positions of face feature points in the infrared image, and deflection angles and interpupillary distances of faces in the visible light image are obtained according to positions of face feature points in the visible light image.

In one embodiment of the present application, the distance between two eyes of a human can be calculated according to the positions of feature points related to the eyes of the human, and then the interpupillary distance of the face can be determined according to the above distance.

S13: selecting a to-be-detected infrared image and a to-be-detected visible light image from the infrared images and visible light images which are acquired by the image acquisition component according to obtained deflection angles and interpupillary distances.

Face images with poor quality in the infrared images and the visible light images acquired by the image acquisition component can be filtered out according to the two parameters of the deflection angle and the interpupillary distance, so as to improve the robustness of the living body detection.

S10: obtaining an to-be-detected infrared image and a to-be-detected visible light image.

S14: performing a grayscale pixel processing on the to-be-detected infrared image to obtain an infrared grayscale image.

In an embodiment of the application, grayscale transformation can be performed on the to-be-detected infrared image to obtain a grayscale image corresponding to the to-be-detected infrared image, and the grayscale image is used as an infrared grayscale image.

S15: normalizing the to-be-detected visible light image to obtain a normalized visible light image.

Normalization of an image refers to a process of transforming the image into a fixed standard image by performing a series of standard processing transformations. The standard image is called a normalized image.

S16: fusing the normalized visible light image and the infrared grayscale image into a four-channel image.

Wherein, the above four-channel image includes: a red, green and blue (RGB) channel image and an infrared grayscale channel image.

The above RGB channel image includes: images corresponding to the three channels of RGB respectively. The above infrared grayscale channel image is: an infrared grayscale image corresponding to the 4th channel.

S20: performing edge detection and texture feature extraction on the to-be-detected infrared image.

In an embodiment of the present application, edge detection may be performed on the infrared grayscale channel image, and texture feature extraction may be performed on the RGB channel image.

In one possible implementation, performing edge detection on the to-be-detected infrared image includes: filtering out noise in the to-be-detected infrared image through Gaussian transformation; performing, through a Sobel operator, edge detection on the to-be-detected infrared image with noise filtered out to obtain an edge detection result; and determining histogram information of the edge detection result in different directions for the number of the edge pixel points, and filtering out noise in the edge detection result according to the histogram information. In this way, the edge information of image regions of faces can be obtained, if any, from the to-be-detected infrared image. In this case, the edge information can be used as the features of image regions of faces, and the features are referred to as the face feature.

In one possible implementation, the living body detection may be based on static image texture. In this case, one or more features with motion invariant properties, such as boundary lines or corner points in the image, need to be extracted from the image, and a living body detection model is created according to these features. And then detecting whether the image is an image acquired for the living body through the living body detection model.

Specifically, in the case that the above living body is a real face, when a real face detection is performed based on static image texture, the real face detection may be implemented based on LBP, Gabor wavelet, HOG, and the like.

In one possible implementation, living body detection may be based on dynamic textures. In this case, when the above living body is a real face, the real face recognition can be performed by learning the structure and dynamic information of the micro-texture of the real face and performed by feature operator expansion in a spatial domain using LBP.

In one possible implementation, extracting the texture features of the to-be-detected infrared image includes: extracting texture features of the to-be-detected infrared image through a Dynamic Local Ternary Pattern (DLTP).

Specifically, the above DLTP is evolved from a Local Ternary Pattern (LTP). LTP is evolved from Local Binary Pattern (LBP).

The procedure of obtaining DLTP information based on LTP is briefly described below.

Assuming that the pixel value of the current pixel point is $g_c$, the gray values of P adjacent pixel points which are centered at the current pixel point are $g_1, g_2, \ldots, g_P$ respectively.

First, $g_c \pm \tau$ is taken as a threshold, a binarization processing is performed on the above adjacent pixel points.

Then, the pixel values of adjacent pixel points after the binarization processing are weighted according to different positions of adjacent pixel points and a weighted sum is calculated, resulting in a local ternary mode value of the current pixel point $f_{LTP_{P,R}}(x_c, y_c, \tau)$, namely, $$f_{LTP_{P,R}}(x_c, y_c, \tau) = \sum_{i=1}^{P} 2^{i-1} s(g_i - g_c)$$

$$s(g_i - g_c) = \begin{cases} 1, & g_i \geq g_c + \tau \\ 0, & g_c - \tau < g_i - g_c < g_c + \tau \\ -1, & g_i \leq g_c - \tau \end{cases}$$

wherein, the $x_c$, $y_c$ are horizontal and vertical coordinates of the current pixel point in the image. $s(g_i - g_c)$ represents the pixel value of the ith adjacent pixel point after the binarization processing.

When the local ternary mode is configured for extracting the texture features of the image, the above value of $\tau$ is difficult to set. In an embodiment of the present application, the above $\tau$ can be determined by Weber's law, the expression of Weber's law is:

$$\tau = \frac{\Delta I}{I} = \frac{|g_c - g_i|}{g_c}$$

Finally, the DLTP histogram obtained by the local ternary mode is:

$$h_j = \sum_{x,y} \delta\{f_{LTP_{P,R}}(x_c, y_c, \tau) - j\}, j = 0, 1, \ldots, 2^P$$

$$\delta(u) = \begin{cases} 1, & u = 0 \\ 0, & u \neq 0 \end{cases}$$

wherein, the x,y are horizontal and vertical coordinates of the pixel points in the image.

S30: performing feature extraction on the to-be-detected visible light image through a convolutional neural network.

The convolutional neural network is a network model which is often used in deep learning. The network model has a multilayer structure, each layer performs feature extraction on input data of the layer, and these extracted features are continuously input into the next layer in the form of a two-dimensional image.

In a possible implementation, when the feature extraction is performed on the to-be-detected visible light image through the convolutional neural network, the feature extraction may be performed on the above four-channel image through the convolutional neural network.

S40: determining whether the to-be-detected infrared image and the to-be-detected visible light image pass the living body detection based on the result of edge detection on the to-be-detected infrared image, the result of extraction of the above texture features and the result of feature extraction on the to-be-detected visible light image through the convolutional neural network.

Therefore, when the solution provided in this embodiment is applied to living body detection, the to-be-detected infrared image and the to-be-detected visible light image can be respectively obtained, edge detection and texture feature extraction are performed on the to-be-detected infrared image, and feature extraction is performed on the to-be-detected visible light image through a convolutional neural network, and whether the to-be-detected infrared image and the to-be-detected visible light image pass living body detection is determined based on the result of edge detection on the to-be-detected infrared image, the result of the above texture feature extraction and the result of the feature extraction on the to-be-detected visible light image through the convolutional neural network. The process can combine the advantages of three technologies of edge detection, texture feature extraction and convolution neural network, and can effectively perform living body detection. In the case that the to-be-detected infrared image and the to-be-detected visible light image include the image regions of a face, it can be efficiently determined whether the face in the image belongs to the face of living body, so as to improve the determination accuracy.

Figure 4:
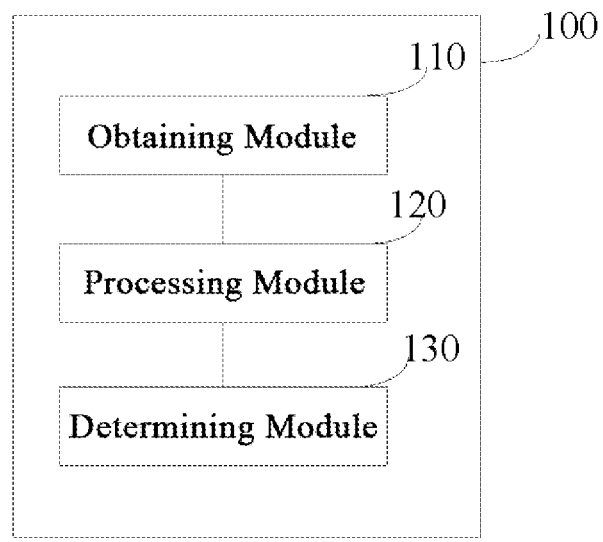
FIG. 4 is a schematic structural diagram of an apparatus for living body detection based on face recognition according to an embodiment of the present application.

FIG. 4 shows a schematic structural diagram of an apparatus for living body detection based on face recognition according to the embodiments of the present application, the apparatus 100 includes: an obtaining module 110, a processing module 120 and a determining module 130.

The obtaining module 110 is configured for a to-be-detected infrared image and a to-be-detected visible light image respectively. The processing module 120 is configured for performing edge detection and texture feature extraction on the to-be-detected infrared image, and performing feature extraction on the to-be-detected visible light image through a convolutional neural network. The determining module 130 is configured for determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network.

In a possible implementation, the obtaining module 110 is specifically configured for acquiring infrared images and visible light images using an image acquisition component; and positioning faces in the infrared images and the visible light images respectively through a face detection algorithm; and obtaining a to-be-detected infrared image and a to-be-detected visible light image from the infrared images and the visible light images according to results of face positioning in the infrared images and the visible light images.

In a possible implementation, the obtaining module 110 is specifically configured for detecting face regions in the infrared images and the visible light images through a face detection algorithm; determining positions of face feature points in the infrared images; and determining positions of face feature points in the visible light images.

In a possible implementation, the obtaining module 110 is specifically configured for obtaining deflection angles and interpupillary distances of faces in the infrared images according to the positions of the face feature points in the infrared images, and obtaining deflection angles and interpupillary distances of faces in the visible light images according to the positions of the face feature points in the visible light images; and selecting, according to obtained deflection angles and interpupillary distances, the to-be-detected infrared image and the to-be-detected visible light image from the infrared images and the visible light images.

In a possible implementation, the obtaining module 110 is specifically configured for acquiring infrared images and visible light images using an image acquisition component; positioning a face in the infrared images and the visible light images respectively through a face detection algorithm; and obtaining an to-be-detected infrared image and a to-be-detected visible light image from the infrared images and the visible light images respectively according to a result of positioning the face in the infrared images and the visible light images respectively.

In a possible implementation, the obtaining module 110 is specifically configured for detecting face regions in the infrared images and the visible light images through a face detection algorithm; determining positions of face feature points in the infrared images; and determining positions of face feature points in the visible light images.

In a possible implementation, the processing module 120 is further configured for performing grayscale pixel processing on the to-be-detected infrared image to obtain an infrared grayscale image; normalizing the to-be-detected visible light image to obtain a normalized visible light image; and fusing the normalized visible light image and the infrared grayscale image into a four-channel image, wherein the four-channel image comprises: a red, green and blue (RGB) channel image and an infrared grayscale channel image, wherein the RGB channel image comprises: images corresponding to three channels of RGB respectively, and the infrared grayscale channel image is: an infrared grayscale image corresponding to the 4th channel.

In a possible implementation, the processing module 120 is specifically configured for performing edge detection on the infrared grayscale channel image, and performing texture feature extraction on the RGB channel image; and performing feature extraction on the four-channel image through a convolutional neural network.

In a possible implementation, the processing module 120 is specifically configured for filtering out noise in the to-be-detected infrared image through Gaussian transformation; performing, through a Sobel operator, edge detection on the to-be-detected infrared image with noise filtered out to obtain an edge detection result; and determining histogram information of the edge detection result in different directions for the number of the edge pixel points, and filtering out noise in the edge detection result according to the histogram information.

In a possible implementation, the processing module 120 is specifically configured for extracting texture features of the to-be-detected infrared image through a dynamic local ternary mode.

Figure 5:
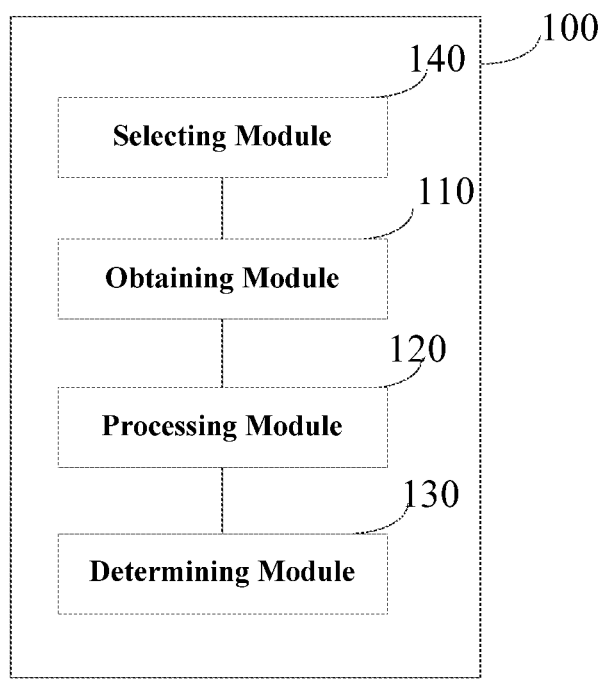
FIG. 5 is another schematic structural diagram of an apparatus for living body detection based on face recognition according to an embodiment of the present application.

FIG. 5 is a schematic structural diagram of an apparatus for living body detection based on face recognition according to an embodiment of the present application, the apparatus 100 includes: an obtaining module 110, a processing module 120, a determining module 130 and a screening module 140.

The screening module 140 is configured for obtaining deflection angles and interpupillary distances of faces in the infrared images according to the positions of the face feature points in the infrared images, and obtaining deflection angles and interpupillary distances of faces in the visible light images according to the positions of the face feature points in the visible light images; and selecting, according to obtained deflection angles and interpupillary distances, the to-be-detected infrared image and the to-be-detected visible light image from the infrared images and the visible light images. The obtaining module 110 is configured for obtaining an to-be-detected infrared image and a to-be-detected visible light image respectively. The processing module 120 is configured for performing edge detection and texture feature extraction on the to-be-detected infrared image. The processing module 120 is further configured for performing feature extraction on the to-be-detected visible light image through a convolutional neural network. The determining module 130 is configured for determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network.

The apparatus 100 provided in this embodiment of the present application may perform the methods described in the foregoing method embodiments, and implement the functions and beneficial effects of the methods described in the foregoing method embodiments, which are not described herein again.

Figure 6:
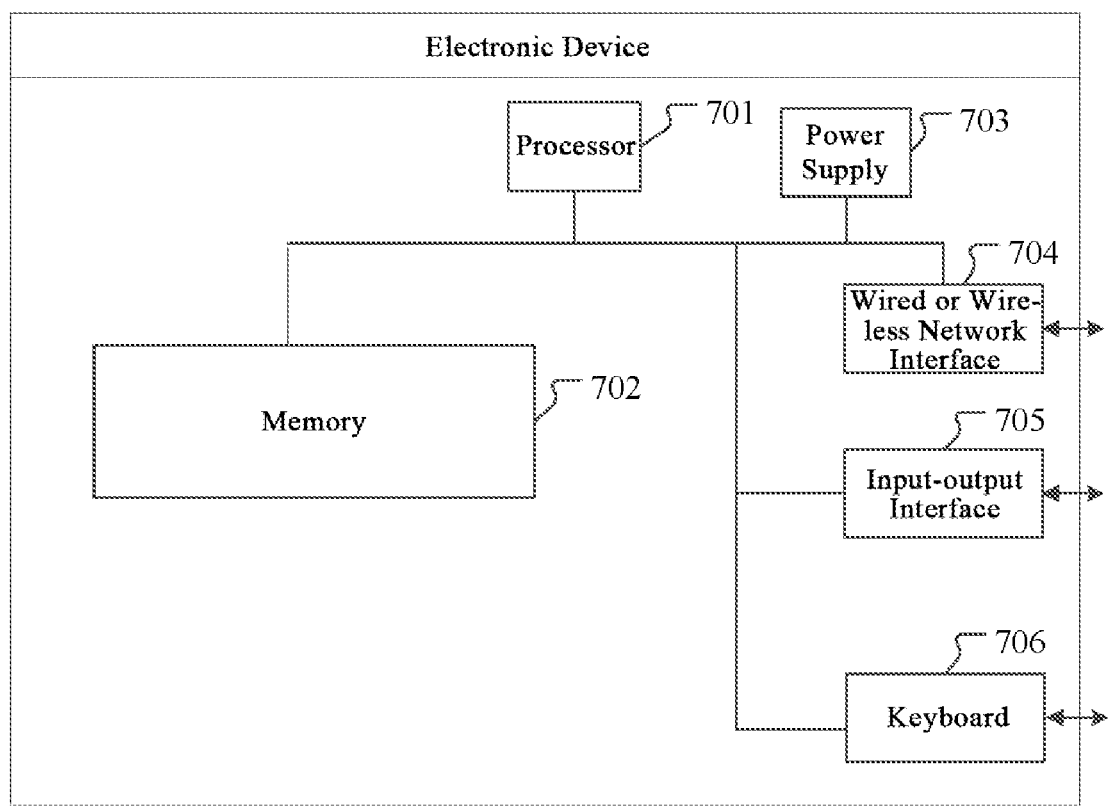
FIG. 6 is a schematic diagram of a hardware structure of an electronic device for executing the method for living body detection based on face recognition according to an embodiment of the present application.

FIG. 6 is a schematic hardware configuration diagram of an electronic device for executing the method for living body detection based on face recognition according to an embodiment of the present application, and as shown in FIG. 6, the electronic device may vary with different configurations or performances, and may include one or more processors 701 and a memory 702. The memory 702 may store one or more application programs or data. Memory 702 may be, among other things, transient storage or persistent storage. The application programs stored in memory 702 may include one or more modules (not shown), each of which may include a series of computer-executable instructions for the electronic device. Furthermore, the processor 701 may be configured to communicate with the memory 702, and execute on the electronic device a series of computer-executable instructions in the memory 702. The electronic device may also include one or more power supplies 703, one or more wired or wireless network interfaces 704, one or more input-output interfaces 705, one or more keyboards 706, and the like.

In an embodiment of the present application, the electronic device shown in FIG. 6 may further include an image acquisition component.

In a specific embodiment, the electronic device includes an image acquisition component for obtaining a to-be-detected infrared image and a to-be-detected visible light image respectively; performing edge detection and texture feature extraction on the to-be-detected infrared image; performing feature extraction on the to-be-detected visible light image through a convolutional neural network; and determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network.

Therefore, the electronic device executing the method for living body detection based on face recognition according to the embodiments of the present application can execute the methods described in the foregoing method embodiments, and implement the functions and beneficial effects of the methods described in the foregoing method embodiments, which are not described herein again.

The electronic device of the embodiments of the present application is existed in various forms, including but not limited to the following devices.

(1) Mobile communication devices, such devices are characterized by mobile communication functions and are primarily targeted at providing voice and data communications. Such terminals include smart phones (e.g., iPhone), multimedia phones, functional phones, and low-end phones, etc.

(2) Ultra-mobile personal computer devices, such devices belong to the category of personal computers, have the functions of calculation and processing, and generally have the mobile internet access feature. Such terminals include PDA, MID, and UMPC devices, such as iPad.

(3) Portable entertainment devices, such devices may display and play multimedia content. Such devices include audio and video players (e.g., iPod), handheld game consoles, e-books, and smart toys and portable car navigation devices.

(4) Server, a device that provides computing services. The composition of the server includes a processor, a hard disk, a memory, a system bus, etc. The server is similar to a general computer architecture, but has higher requirements on processing capacity, stability, reliability, safety, expandability, manageability and the like due to the need of providing high-reliability service.

(5) Other electronic devices with data interaction functions.

Further, the embodiments of the present application also provide a system for living body detection based on face recognition, comprising: an image acquisition component for acquiring infrared images and visible light images; an electronic device, comprising: a processor; and a memory configured to store computer executable instructions that, when executed, cause the processor to perform the following operations: obtaining infrared images and visible light images acquired by the image acquisition component, and selecting a to-be-detected infrared image and a to-be-detected visible light image; performing edge detection and texture feature extraction on the to-be-detected infrared image; performing feature extraction on the to-be-detected visible light image through a convolutional neural network; and determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network.

Therefore, the system for living body detection based on face recognition, which is further provided by the embodiments of the present application, can perform the methods described in the foregoing method embodiments, and implement the functions and beneficial effects of the methods described in the foregoing method embodiments, which are not described herein again.

Further, the embodiments of the present application also provides a computer-readable storage medium for storing computer-executable instructions, the computer-executable instructions, when executed by a processor, implement the following operations: obtaining a to-be-detected infrared image and a to-be-detected visible light image respectively; performing edge detection and texture feature extraction on the to-be-detected infrared image; performing feature extraction on the to-be-detected visible light image through a convolutional neural network; and determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network.

Therefore, when executed by a processor, the computer-executable instructions are capable of performing the methods described in the foregoing method embodiments, and implementing the functions and beneficial effects of the methods described in the foregoing method embodiments, which are not described herein again.

The computer-readable storage medium includes a Read-Only Memory (ROM), a Random Access Memory (RAM), a magnetic disk or an optical disk.

Further, the embodiments of the present application also provide a computer program product, the computer program product includes a computer program stored on a non-transitory computer readable storage medium, the computer program includes program instructions that, when executed by a computer, implement the following processes: obtaining a to-be-detected infrared image and a to-be-detected visible light image respectively; performing edge detection and texture feature extraction on the to-be-detected infrared image; performing feature extraction on the to-be-detected visible light image through a convolutional neural network; and determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network.

Therefore, when the computer program product provided in the embodiments of the present application is executed, the methods described in the foregoing method embodiments can be executed, and functions and beneficial effects of the methods described in the foregoing method embodiments are implemented, which are not described herein again.

All the embodiments in the present specification are described in a progressive manner, and the same and similar parts among the embodiments are referred to each other, and each embodiment focuses on the differences from other embodiments. In particular, for the apparatus, the electronic device, the computer-readable medium, the computer program product, and the system embodiments, since they are substantially similar to the method embodiments, the description is relatively simple, and in relation to the method embodiments, reference may be made to the partial description of the method embodiments.

The above description is only an example of the present application and is not intended to limit the present application. Various modifications and changes for the present application may occur to those skilled in the art. Any modification, equivalent replacement, improvement or the like made within the spirit and principle of the present application shall be included in the scope of the claims of the present application.

What is claimed is:

1. A method for living body detection based on face recognition, comprising:
  obtaining a to-be-detected infrared image and a to-be-detected visible light image respectively;
  performing edge detection and texture feature extraction on the to-be-detected infrared image;
  performing feature extraction on the to-be-detected visible light image through a convolutional neural network; and
  determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network;

after the obtaining the to-be-detected infrared image and the to-be-detected visible light image respectively, the method further comprises:

performing grayscale pixel processing on the to-be-detected infrared image to obtain an infrared grayscale image;

normalizing the to-be-detected visible light image to obtain a normalized visible light image; and fusing the normalized visible light image and the infrared grayscale image into a four-channel image, wherein the four-channel image comprises: a red, green and blue (RGB) channel image and an infrared grayscale channel image, wherein the RGB channel image comprises: images corresponding to three channels of RGB respectively, and the infrared grayscale channel image is: an infrared grayscale image corresponding to the 4th channel;

wherein performing edge detection and texture feature extraction on the to-be-detected infrared image comprises: performing edge detection on the infrared grayscale channel image, and performing texture feature extraction on the RGB channel image; and wherein performing feature extraction on the to-be-detected visible light image through a convolutional neural network comprises: performing feature extraction on the four-channel image through the convolutional neural network.

2. The method of claim 1, before the obtaining the to-be-detected infrared image and the to-be-detected visible light image respectively, the method further comprises:

acquiring infrared images and visible light images using an image acquisition component; and positioning faces in the infrared images and the visible light images respectively through a face detection algorithm;

wherein obtaining a to-be-detected infrared image and a to-be-detected visible light image respectively comprises:

obtaining a to-be-detected infrared image and a to-be-detected visible light image from the infrared images and the visible light images respectively according to results of face positioning in the infrared images and the visible light images.

3. The method of claim 2, wherein positioning faces in the infrared images and the visible light images respectively through a face detection algorithm comprises:

detecting face regions in the infrared images and the visible light images through a face detection algorithm;

determining positions of face feature points in the infrared images; and determining positions of face feature points in the visible light images.

4. The method of claim 3, wherein obtaining a to-be-detected infrared image and a to-be-detected visible light image from the infrared images and the visible light images respectively according to results of face positioning in the infrared images and the visible light images comprises:

obtaining deflection angles and interpupillary distances of faces in the infrared images according to the positions of the face feature points in the infrared images, and obtaining deflection angles and interpupillary distances of faces in the visible light images according to the positions of the face feature points in the visible light images; and selecting, according to obtained deflection angles and interpupillary distances, the to-be-detected infrared image and the to-be-detected visible light image from the infrared images and the visible light images.

5. The method of claim 1, wherein performing edge detection on the to-be-detected infrared image comprises:

filtering out noise in the to-be-detected infrared image through Gaussian transformation;

performing, through a Sobel operator, edge detection on the to-be-detected infrared image with noise filtered out to obtain an edge detection result; and determining histogram information of the edge detection result in different directions for the number of the edge pixel points, and filtering out noise in the edge detection result according to the histogram information.

6. The method of claim 1, wherein performing texture feature extraction on the to-be-detected infrared image comprises:

extracting texture features of the to-be-detected infrared image through a dynamic local ternary mode.

7. An electronic device, comprising:

an image acquisition component for obtaining a to-be-detected infrared image and a to-be-detected visible light image respectively;

a processor; and a memory configured to store computer executable instructions that, when executed, use the processor to perform the following operations:

performing edge detection and texture feature extraction on the to-be-detected infrared image;

performing feature extraction on the to-be-detected visible light image through a convolutional neural network; and determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network;

after the obtaining the to-be-detected infrared image and the to-be-detected visible light image respectively, the electronic device is further configured for:

performing grayscale pixel processing on the to-be-detected infrared image to obtain an infrared grayscale image;

normalizing the to-be-detected visible light image to obtain a normalized visible light image; and fusing the normalized visible light image and the infrared grayscale image into a four-channel image, wherein the four-channel image comprises: a red, green and blue (RGB) channel image and an infrared grayscale channel image, wherein the RGB channel image comprises: images corresponding to three channels of RGB respectively, and the infrared grayscale channel image is: an infrared grayscale image corresponding to the 4th channel;

wherein performing edge detection and texture feature extraction on the to-be-detected infrared image comprises: performing edge detection on the infrared grayscale channel image, and performing texture feature extraction on the RGB channel image; and wherein performing feature extraction on the to-be-detected visible light image through a convolutional neural network comprises: performing feature extraction on the four-channel image through the convolutional neural network.

8. The electronic device of claim 7, before obtaining the to-be-detected infrared image and the to-be-detected visible light image respectively, the electronic device is further configured for:
  acquiring infrared images and visible light images using an image acquisition component; and
  positioning faces in the infrared images and the visible light images respectively through a face detection algorithm;
  wherein, obtaining a to-be-detected infrared image and a to-be-detected visible light image respectively comprises:
  obtaining a to-be-detected infrared image and a to-be-detected visible light image from the infrared images and the visible light images respectively according to results of face positioning in the infrared images and the visible light images.

9. The electronic device of claim 8, wherein positioning faces in the infrared images and the visible light images respectively through the face detection algorithm comprises:
  detecting face regions in the infrared images and the visible light images through a face detection algorithm;
  determining positions of face feature points in the infrared images; and
  determining positions of face feature points in the visible light images.

10. The electronic device of claim 9, wherein obtaining a to-be-detected infrared image and a to-be-detected visible light image from the infrared images and the visible light images respectively according to results of face positioning in the infrared images and the visible light images comprises:
  obtaining deflection angles and interpupillary distances of faces in the infrared images according to the positions of the face feature points in the infrared images, and obtaining deflection angles and interpupillary distances of faces in the visible light images according to the positions of the face feature points in the visible light images; and
  selecting, according to obtained deflection angles and interpupillary distances, the to-be-detected infrared image and the to-be-detected visible light image from the infrared images and the visible light images.

11. The electronic device of claim 7, wherein performing edge detection on the to-be-detected infrared image comprises:
  filtering out noise in the to-be-detected infrared image through Gaussian transformation;
  performing, through a Sobel operator, edge detection on the to-be-detected infrared image with noise filtered out to obtain an edge detection result; and
  determining histogram information of the edge detection result in different directions for the number of the edge pixel points, and filtering out noise in the edge detection result according to the histogram information.

12. The electronic device of claim 7, wherein performing texture feature extraction on the to-be-detected infrared image comprises:
  extracting texture features of the to-be-detected infrared image through a dynamic local ternary mode.

13. A non-transitory computer readable medium storing one or more programs that, when executed by an electronic device, cause the electronic device to perform the method of claim 1.

14. A system for living body detection based on face recognition, comprising:
  an image acquisition component for acquiring infrared images and visible light images;
  an electronic device, comprising: a processor; and a memory configured to store computer executable instructions that, when executed, cause the processor to perform the following operations:
  obtaining infrared images and visible light images acquired by the image acquisition component, and selecting a to-be-detected infrared image and a to-be-detected visible light image;
  performing edge detection and texture feature extraction on the to-be-detected infrared image;
  performing feature extraction on the to-be-detected visible light image through a convolutional neural network; and
  determining whether the to-be-detected infrared image and the to-be-detected visible light image pass living body detection based on a result of the edge detection on the to-be-detected infrared image, a result of the texture feature extraction on the to-be-detected infrared image, and a result of the feature extraction on the to-be-detected visible light image through the convolutional neural network;
  after obtaining infrared images and visible light images acquired by the image acquisition component, and selecting a to-be-detected infrared image and a to-be-detected visible light image, the electronic device is further configured for:
  performing grayscale pixel processing on the to-be-detected infrared image to obtain an infrared grayscale image;
  normalizing the to-be-detected visible light image to obtain a normalized visible light image; and
  fusing the normalized visible light image and the infrared grayscale image into a four-channel image, wherein the four-channel image comprises: a red, green and blue (RGB) channel image and an infrared grayscale channel image, wherein the RGB channel image comprises: images corresponding to three channels of RGB respectively, and the infrared grayscale channel image is: an infrared grayscale image corresponding to the 4th channel;
  wherein performing edge detection and texture feature extraction on the to-be-detected infrared image comprises: performing edge detection on the infrared grayscale channel image, and performing texture feature extraction on the RGB channel image; and
  wherein performing feature extraction on the to-be-detected visible light image through a convolutional neural network comprises: performing feature extraction on the four-channel image through the convolutional neural network.

* * * * *